US012719164B2

(12) United States Patent
Kalavakuru et al.

(10) Patent No.: US 12,719,164 B2
(45) Date of Patent: Aug. 25, 2026

(54) WIRELESS ACCESS POINT SYSTEM

(71) Applicant: Cisco Technology, Inc., San Jose, CA (US)

(72) Inventors: Sivadeep R. Kalavakuru, Akron, OH (US); Navid Pourramzangandji, Copley, OH (US); Ardalan Alizadeh, Milpitas, CA (US); Matthew A. Silverman, Shaker Heights, OH (US); Fred J. Anderson, Lakeville, OH (US)

(73) Assignee: Cisco Technology, Inc., San Jose, CA (US)

(*) Notice: Subject to any disclaimer, the term of this patent is extended or adjusted under 35 U.S.C. 154(b) by 907 days.

(21) Appl. No.: 18/061,421

(22) Filed: Dec. 2, 2022

(65) Prior Publication Data

US 2024/0186697 A1 Jun. 6, 2024

(51) Int. Cl.

| | |
|---|---|
| ***H01Q 3/36*** | (2006.01) |
| ***H01Q 1/22*** | (2006.01) |
| ***H01Q 1/48*** | (2006.01) |
| ***H01Q 9/04*** | (2006.01) |

(52) U.S. Cl.

CPC ............. *H01Q 3/36* (2013.01); *H01Q 1/2291* (2013.01); *H01Q 1/48* (2013.01); *H01Q 9/045* (2013.01)

(58) Field of Classification Search

CPC .......... H01Q 3/36; H01Q 1/2291; H01Q 1/48; H01Q 9/045

See application file for complete search history.

(56) References Cited

U.S. PATENT DOCUMENTS

| | | | | |
|---|---|---|---|---|
| 2004/0041734 A1* | 3/2004 | Shiotsu | H01Q 9/42 343/702 |
| 2005/0064872 A1* | 3/2005 | Osseiran | H04B 7/0408 455/562.1 |
| 2006/0022889 A1 | 2/2006 | Chiang et al. | |

(Continued)

FOREIGN PATENT DOCUMENTS

WO 2018096306 A1 5/2018

OTHER PUBLICATIONS

International Search Report and Written Opinion for International Application No. PCT/US2023/080770, mailed Apr. 11, 2024, 16 Pages.

(Continued)

*Primary Examiner* — Junpeng Chen

(74) *Attorney, Agent, or Firm* — Patterson + Sheridan, LLP

(57) ABSTRACT

A wireless access point system is provided that includes at least one of a beamforming module adapted to set a resonant impedance value of impedance tuning elements of a first sub-array, wherein respective antenna elements of the first sub-array resonate at a first frequency, the beamforming module further adapted to set a non-resonant impedance value of the impedance tuning elements of a second sub-array for suppressing antenna element resonance at the first frequency, thereby configuring the array to provide a beamformed wireless communication signal; or a beamsteering module adapted to set the resonant impedance value for the impedance tuning elements of the first sub-array and set the non-resonant impedance value for the impedance tuning elements of the second sub-array for steering the beamformed wireless communication signal.

28 Claims, 15 Drawing Sheets

(56) References Cited

U.S. PATENT DOCUMENTS

| | | | | |
|---|---|---|---|---|
| 2011/0309980 | A1 | 12/2011 | Ali et al. | |
| 2012/0112815 | A1* | 5/2012 | Mason | H05H 1/46 327/419 |
| 2017/0005481 | A1* | 1/2017 | Von Novak, III | H02J 50/70 |
| 2019/0181565 | A1* | 6/2019 | Xia | H01Q 5/35 |
| 2020/0203853 | A1 | 6/2020 | Hu et al. | |
| 2021/0257732 | A1 | 8/2021 | Achour et al. | |
| 2021/0384939 | A1 | 12/2021 | Klomsdorf et al. | |
| 2021/0399771 | A1 | 12/2021 | Ahn et al. | |
| 2022/0094053 | A1* | 3/2022 | Jiang | H01Q 5/42 |
| 2025/0226804 | A1* | 7/2025 | Cheng | H03F 1/565 |

OTHER PUBLICATIONS

Cisco, Cisco Catalyst 9130 Access Point with 9104 Stadium Antenna (C-ANT9104) Installation Guide, <https://www.cisco.com/c/en/us/td/docs/wireless/antenna/installation/guide/b-ant9104ax_ig/introduction.html>.

Pivotal Commware, <https://pivotalcommware.com/technology/>.

* cited by examiner

Frequency = 5.5 GHz
Main lobe magnitude = 16.4 dBi
Mail lobe direction = 15.0 deg.
Angular width (3dB) = 20.3 deg.
Side lobe level = -13.4 dB

500

600

700

WIRELESS ACCESS POINT SYSTEM

TECHNICAL FIELD

Embodiments presented in this disclosure generally relate to wireless access point systems. More specifically, embodiments disclosed herein relate to antenna arrays of wireless access point systems.

BACKGROUND

Standard techniques for beam steering and beamforming multiple channel frequencies of an IEEE 802.11 technical standard (e.g., 5 to 6.9 Ghz) include complex circuitry such as Butler matrixes for phase shifting and multiple antenna arrays that are each adapted for particular channel frequencies. Such wireless access systems require multiple arrays to provide and receive wireless RF signals over multiple frequencies.

Such designs, however, are relatively expensive and introduce substantial post-front end module signal losses, thereby incurring relatively poor Rx and Tx performance.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
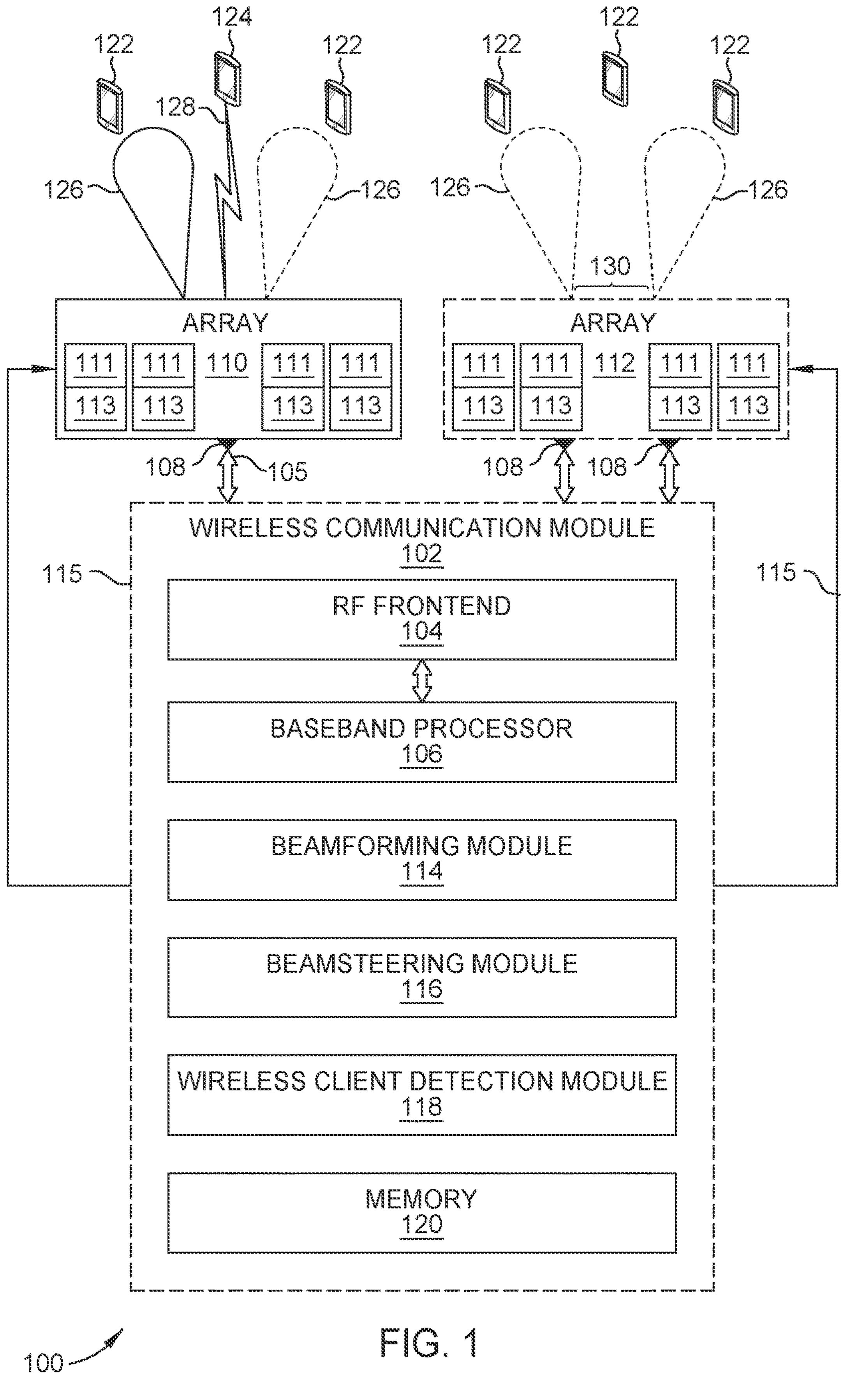
FIG. 1 shows a high-level system architecture example of an embodiment.

One embodiment presented in this disclosure, a wireless access point system includes an RF feed port, a transmission line communicatively coupled to the RF feed port and arranged for receiving and providing RF communication signals, an array including antenna elements that are communicatively coupled to the transmission line and arranged for wireless communication, and impedance tuning elements that are each electrically coupled to a respective antenna element of the array.

The wireless access point system further includes at least one of (1) a beamforming module adapted to set a resonant impedance value of the impedance tuning elements of a first sub-array, wherein the respective antenna elements of the first sub-array resonate at a first frequency, the beamforming module further adapted to set a non-resonant impedance value of the impedance tuning elements of a second sub-array for suppressing antenna element resonance at the first frequency, thereby configuring the array to provide a beamformed wireless communication signal; or (2) a beamsteering module adapted to set the resonant impedance value for the impedance tuning elements of the first sub-array and set the non-resonant impedance value for the impedance tuning elements of the second sub-array for steering the beamformed wireless communication signal.

In one aspect, in combination with any example system above or below, the impedance tuning elements include variable capacitors that are each electrically coupled to an RF ground and the respective antenna element. In one aspect, in combination with any example system above or below, the impedance tuning elements include reverse-biased diodes that are each electrically coupled to the RF ground and the respective antenna element and at least one of the beamforming module and the beamsteering module adapted to modify a reverse DC bias of each of the reverse-biased diodes. In one aspect, in combination with any example system above or below, the reverse-biased diodes include at least one of a varactor diode and a PIN diode.

In one aspect, in combination with any example system above or below, the antenna elements each define a respective aperture and the antenna elements are arranged to be communicatively coupled to the transmission line via aperture coupling. In one aspect, in combination with any example system above or below, the antenna elements include patch elements. In one aspect, in combination with any example system above or below, the array includes a first plurality of antenna elements that are communicatively coupled to a first RF port and a second plurality of antenna elements that are communicatively coupled to a second RF port.

In one aspect, in combination with any example system above or below, at least one of the beamforming module and the beamsteering module is adapted to set, as the non-resonant impedance value, an electrical short-circuit impedance value of the impedance tuning elements of the second sub-array, the impedance tuning elements of the second sub-array configured to electrically short at the first frequency, thereby suppressing parasitic coupling between the antenna elements of the first and the second sub-arrays.

In one aspect, in combination with any example system above or below, the antenna elements of the first and the second sub-arrays are arranged as at least a row of the array. In one aspect, in combination with any example system above or below, the antenna elements of the first and the second sub-arrays are respectively arranged as at least first column and at least a second column of the array. In one aspect, in combination with any example system above or below, the antenna elements of the first sub-array are arranged as a first set of rows and columns of the array and the antenna elements of the second sub-array are arranged as a second set of rows and columns of the array.

In one aspect, in combination with any example system above or below, the beamforming module is adapted to modify the beamformed wireless communication signal by selectively resonating different arrangements of the antenna elements as the first sub-array. In one aspect, in combination with any example system above or below, the beamsteering module is adapted to steer the beamformed wireless communication signal by selectively resonating different arrangements of the antenna elements of the first sub-array.

In one aspect, in combination with any example system above or below, the wireless access point system further includes a circuit substrate that is operably coupled to the RF feed port, the transmission line, the array, and the impedance tuning elements.

In one aspect, in combination with any example system above or below, the beamforming module is adapted to select at least one of the resonant impedance value from a plurality of resonant impedance values and the non-resonant impedance value from a plurality of non-resonant impedance values, thereby selecting a radiation pattern of the beamformed wireless communication signal. In one aspect, in combination with any example system above or below, the wireless access point system further includes a memory that includes the plurality of resonant impedance values and the plurality of non-resonant impedance values.

In one aspect, in combination with any example system above or below, the beamsteering module is adapted to select at least one of the resonant impedance value from a plurality of resonant impedance values and the non-resonant impedance value from a plurality of non-resonant impedance values, thereby selecting a steering angle from a plurality of steering angles for the beamformed wireless communication signal. In one aspect, in combination with any example system above or below, the wireless access point system further includes a memory that includes the plurality of resonant impedance values and the plurality of non-resonant impedance values.

In one aspect, in combination with any example system above or below, the beamforming module is adapted to configure the array to provide a plurality of beamformed wireless communication signals. In one aspect, in combination with any example system above or below, the beamforming module is adapted to configure the array to provide a null that is arranged between or among beamformed wireless communication signals. In one aspect, in combination with any example system above or below, the wireless access point system further includes a wireless client detection module that is adapted to detect a wireless client via the null.

In one aspect, in combination with any example system above or below, the wireless access point system further includes a wireless communication module communicatively coupled to the RF feed port and adapted to provide wireless communication channels of the beamformed wireless communication signal. In one aspect, in combination with any example system above or below, the wireless communication module includes an RF frontend communicatively coupled to the RF feed port and a baseband processor communicatively coupled to the RF frontend.

In one aspect, in combination with any example system above or below, the wireless communication module is adapted to provide the wireless communication channels according to an IEEE 802.11 technical standard. In one aspect, in combination with any example system above or below, at least one of the wireless communication channels include a center frequency between 1 GHz and 10 GHz.

In another embodiment presented in this disclosure, a method includes selecting, from a plurality of resonant impedance values and a plurality of non-resonant impedance values stored in memory, a resonant impedance value for impedance tuning elements that are each electrically coupled to a respective antenna element of a first sub-array of an antenna array and a non-resonant impedance value for impedance tuning elements that are each electrically coupled to a respective antenna element of a second sub-array of the antenna array; setting, by a wireless communication module, the impedance tuning elements of the first sub-array to the resonant impedance value and the impedance tuning elements of the second sub-array to the non-resonant impedance value, thereby configuring the antenna array to provide a beamformed wireless communication signal; and modifying, by the wireless communication module, the beamformed wireless communication signal by selectively resonating different arrangements of first sub-array antenna elements and selectively suppressing resonance of different arrangements of second sub-array antenna elements.

In one aspect, in combination with any example method above or below, the modifying step includes modifying, by the wireless communication module, the beamformed wireless communication signal by selecting, from the plurality of resonant impedance values and the plurality of non-resonant impedance values stored in memory, a second resonant impedance value for impedance tuning elements that are each electrically coupled to the respective antenna element of the first sub-array and a second non-resonant impedance value for impedance tuning elements that are each electrically coupled to the respective antenna element of a second sub-array, thereby selectively resonating different arrangements of first sub-array antenna elements and selectively suppressing resonance of different arrangements of second sub-array antenna elements.

In one aspect, in combination with any example method above or below, the plurality of resonant and non-resonant values stored in memory may provide a plurality of radiation patterns, thereby providing beam switching among differing beam shapes and/or beamsteering according to differing steering angles.

In another embodiment presented in this disclosure, a wireless communication module is adapted to at least one of (1) set a resonant impedance value of impedance tuning elements of a first sub-array of an antenna element array for resonating respective antenna elements of the first sub-array at a first frequency and set a non-resonant impedance value of impedance tuning elements of a second sub-array of the antenna element array for suppressing antenna element resonance at the first frequency, thereby providing a beamformed wireless communication signal; or (2) set the resonant impedance value for the impedance tuning elements of the first sub-array and set the non-resonant impedance value for the impedance tuning elements of the second sub-array for steering the beamformed wireless communication signal.

In one aspect, the wireless communication module may be combined with any example wireless access point system above or below.

Example Embodiments

As explained in more detail, embodiment aspects include a flexible, re-configurable array that may provide a number of radiation patterns via different sub-array arrangements of antenna elements. Each sub-array arrangement may produce a main lobe, which may be steered by "moving" the sub-array arrangement by selectively resonating different antenna element sub-arrays. As such, an array according to various embodiment aspects can be repeatedly re-configured to provide a variety of main lobes in terms of the number of main lobes (e.g., 1 or more), radiation pattern, and strengths. Such main lobes may also be steered with high granularity, but at low computational and circuit complexity (e.g., by varying a capacitance of a tuning element) compared with previous designs.

Reference is now made to FIG. 1, which illustrates a high-level block representation of wireless access point system 100 according to an embodiment aspect. System 100 may include wireless communication module 102, RF frontend 104, baseband processor 106, beamforming module 114, beamsteering module 116, wireless client detection module 118, and memory 120.

Wireless communication module 102 may be a WiFi module and/or implement one or more IEEE 802.11 technical standards in providing one or more wireless communication channels. In one aspect, at least one of the wireless communication channels includes a center frequency between around 1 GHz and 10 GHz. In another aspect, at least one of the wireless communication channels includes a center frequency below 7 GHz.

Module 102 is operably coupled to array 110 and optional array 112 for receive and transmitting RF (radio frequency) communication signals. For example, antenna array 110 includes antenna elements 111, with each element 111 electrically coupled to a respective impedance tuning element 113. RF communication signals are provided to and received from the antenna elements 111 via RF ports 108 and signal line(s) 105, which are communicatively coupled to RF frontend 104 and baseband processor 106.

As detailed below, beamforming module 114 and/or beamsteering module 116 may, via signal line(s) 115, set and/or modify an impedance value of impedance tuning elements 113 for beamforming and/or beamsteering one or more main lobes 126 (e.g., a beam).

Sub-arrays of antenna elements 111 may form different radiation patterns with flexibly directed main lobes 126 depending on the impedance value of a sub-array impedance tuning elements 113. In one aspect, at least one of the beamforming module 114 and beamsteering module 116 may set a resonant impedance value of the impedance tuning elements 113 of a first-sub array to resonate at a first frequency and set a non-resonant impedance value of the impedance tuning elements 113 of a second sub-array for suppressing antenna element resonance at the first frequency.

A beamformed main lobe 126 (e.g., a beamformed wireless communication signal) is thus provided to wireless clients 122. Array 110 may provide one or more main lobes 126, thereby providing one or more beamformed wireless communication signals. In one aspect, main lobes 126 may be provided by a respective sub-array with null 130 arranged therebetween. In one aspect, wireless client detection module 118 may detect wireless client 124 via wireless signal 128, which may be emitted by wireless client 124 and received by antenna elements 111 that are arranged at least partially between main lobes 126.

As detailed below, resonant and non-resonant impedance values may be stored in memory 120 for providing a variety of beam shapes (e.g., beam switching among different radiation patterns) and/or beam steering main lobe 126. For example, a first and second sub-array of antenna elements 113 may have their respective impedance tuning elements 113 set to impedance values that are pre-determined and stored in memory 120. Additionally or alternatively, impedance values may be determined during or after installation of module 102 (e.g., installed within a large public venue such as a sports stadium).

Optional array 112 may provide two RF feed ports 108 for either providing the same or different wireless communication channel data. For example, the same RF signal may be fed to all antenna elements 111 for providing differential main lobes 126. Alternatively, a (1) first RF feed port 108 feeds a first RF signal to a first sub-array of antenna elements 111 and (2) a second RF feed port 108 feeds a second RF signal to a second sub-array of (different) antenna elements 111, thereby each main lobe 126 provides separate, distinct wireless communication channels.

Figure 2:
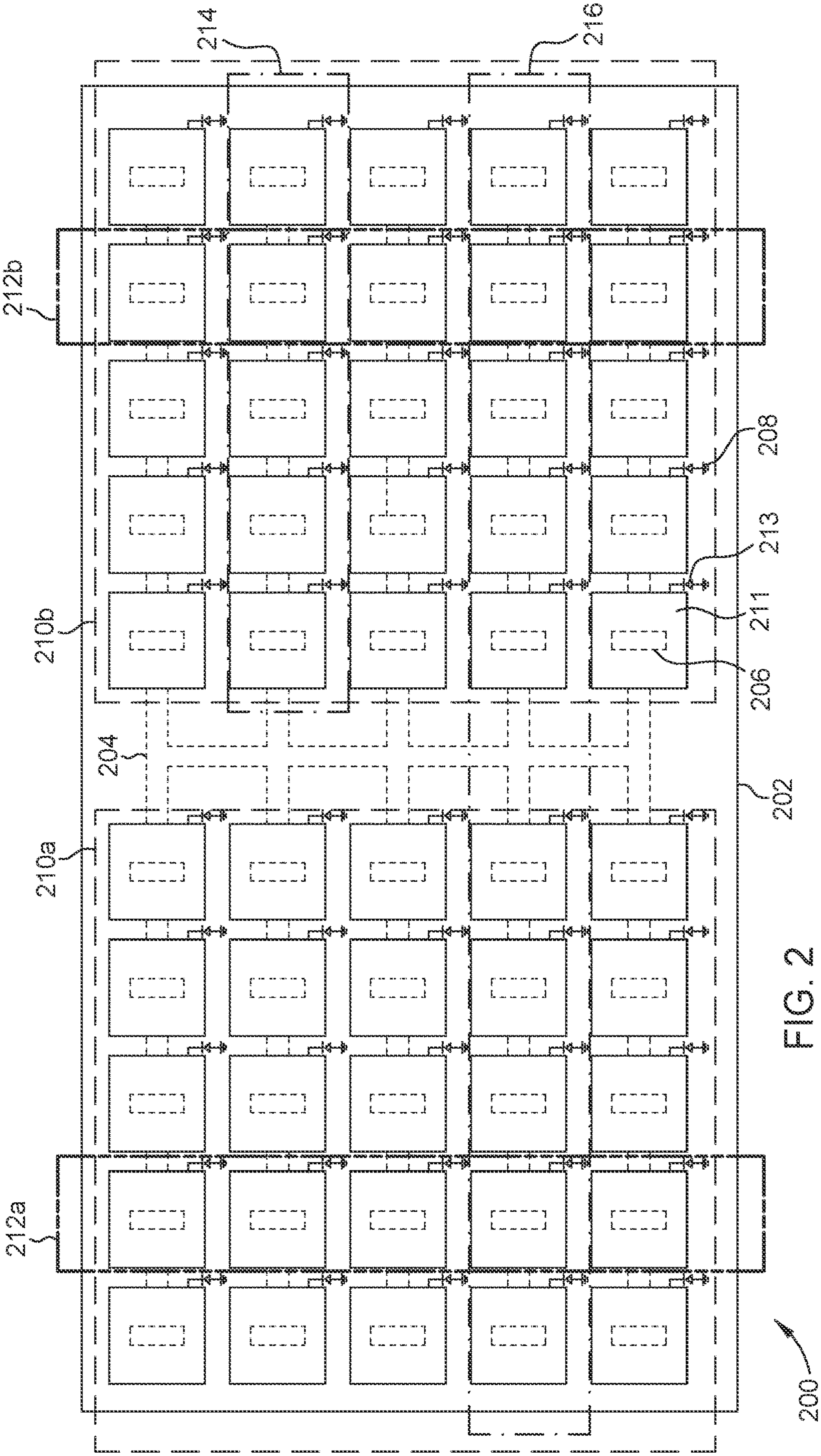
FIGS. 2 and 3A show example arrays.

FIG. 2 shows array 200 according to an embodiment. Array 200 may include circuit substrate 202 on which a transmission line 204 is arranged. Transmission line 204 is communicatively coupled to each antenna element 211 (e.g., a patch element), which respectively define aperture 206. Transmission line 204 may be communicatively coupled with each antenna element 211 via aperture coupling. Each antenna element 211 is electrically coupled to diode 213, which is further electrically coupled to RF ground 208. Diodes 213, as the impedance tuning elements, may be varactor diodes and/or a PIN diodes.

In one aspect, each diode 213 may be operated as reverse-biased diodes and at least one of beamforming module 114 and beamsteering module 116 are adapted to modify a reverse DC bias of each of the diodes 213, thereby altering a capacitance value of diodes 213. As explained in more detail, in one aspect a first sub-array of diodes 213 are set to a resonant impedance value (e.g., a capacitance value) for an electrically coupled antenna element 211 to resonate at a first frequency. In one aspect, diodes 213 "outside" of the first sub-array (e.g., a second sub-array) are set to a non-resonant impedance value for suppressing resonance of antenna elements at the first frequency.

As an example, a resonating sub-array may be sub-array 210*a* (a five row by five column sub-array or 5×5 sub-array) while sub-array 210*b*, also a 5×5 sub-array, is set to suppress resonance. As shown in FIGS. 3B-E, this sub-array arrangement may provide a relatively narrow main lobe (e.g., 20 degrees in azimuth and elevation). Such a lobe may be steered, for example, by resonating different groupings of 5×5 arrays of antenna elements 211 as a first sub-array and suppressing resonance (e.g., electrically shorting) of the other antenna elements 211.

Alternatively or additionally, each sub-array 210*a* and 210*b* may be operated as separate 5×5 arrays. For example, a subset of antenna elements of sub-array 210*a* (e.g., sub-array 212*a*) may be resonated. In one aspect, the corresponding subset (e.g., a mirror-image 5×1 sub-array 212*b*) of sub-array 210*b* may also be resonated. In one aspect, sub-arrays 210*a* and 210*b* in this manner are fed the same RF signal, thereby providing differential lobes with a null arranged therebetween.

Alternatively or additionally, each sub-array 210*a* and 210*b* may have respective subsets of antenna elements independently resonated. For example, sub-array 210*a* may transmit and receive data over a first set of wireless communication channels via a first RF port and 5×1 sub-array 212*a* and sub-array 210*b* may independently transmit and receive data over a second (different) set of wireless communication channels and/or frequencies via a second (different) RF port (e.g., as shown in array 112) and 1×5 sub-array 214.

In one aspect, a main lobe with a wide azimuth (e.g., 90 degrees), but narrow elevation (e.g., 20 degrees) may be provided by resonating sub-array 212*a*. A main lobe with a narrow azimuth (e.g., 20 degrees) and wide elevation (e.g., 90 degrees) may be provided by resonating 1×10 sub-array 216, the radiation pattern of which is shown in FIGS. 4C-F. In either case, neighboring antenna element columns or rows may be selectively resonated while the antenna elements of shown sub-array 212*a* or 216 are electrically shorted for beam steering a respective main lobe.

In one aspect, various main lobes are increased or decreased in strength (e.g., 3 dB (farfield) in both azimuth and elevation) by resonating further rows and/or columns of antenna elements 211, thereby expanding a resonant sub-array. For example, sub-array 212*a* may be expanded from a 5×1 sub-array into a 5×2 or 5×3 sub-array. In another example, sub-array 216 may be expanded from a 1×10 sub-array into a 2×10 or 3×10 sub-array.

The various sub-array arrangements may be characterized by tuning element values for each antenna element that are stored in, for example, memory 120. In one aspect, each sub-array arrangement may be characterized by an impedance value (e.g., a capacitance value) of diode 213 that causes an antenna element 211 to resonate at a first frequency and an impedance value that causes other antenna elements 211 to electrically short circuit at the first frequency (e.g., an electrical short-circuit impedance value), thereby suppressing potential parasitic resonances by antenna elements 211 that neighbor the resonating sub-array.

As these examples show, array 200 may provide a number of different sub-array arrangements for providing main lobes of various radiation patterns and strengths, which may be steered by "moving" the sub-array arrangement across array 200 by resonating different sub-arrays of antenna elements 211. As such, various embodiments provide a flexible antenna array that can be repeatedly re-configured to provide a variety of main lobes with different radiation patterns (e.g., beam width switching) and strengths and flexibly beam steer with high granularity, but at low computational and circuit complexity compared with previous designs.

Although array 200 is shown as a 5×10 rectangular array of antenna elements 211, other embodiment array arrangements may be provided including different rectangular or square array sizes (e.g., 7×7, 10×10) and non-rectangular arrangements such as a circular and/or an irregularly arranged array of antenna elements. Further, sub-arrays may be non-continuous in that a sub-array column or row may not immediately neighbor the other columns or rows of the sub-array. For example, a 5×5 first sub-array may have a 5×1 portion of the second subarray on one side of the first sub-array and a 5×4 portion of the second subarray on the other side of the first sub-array.

Figure 3A:
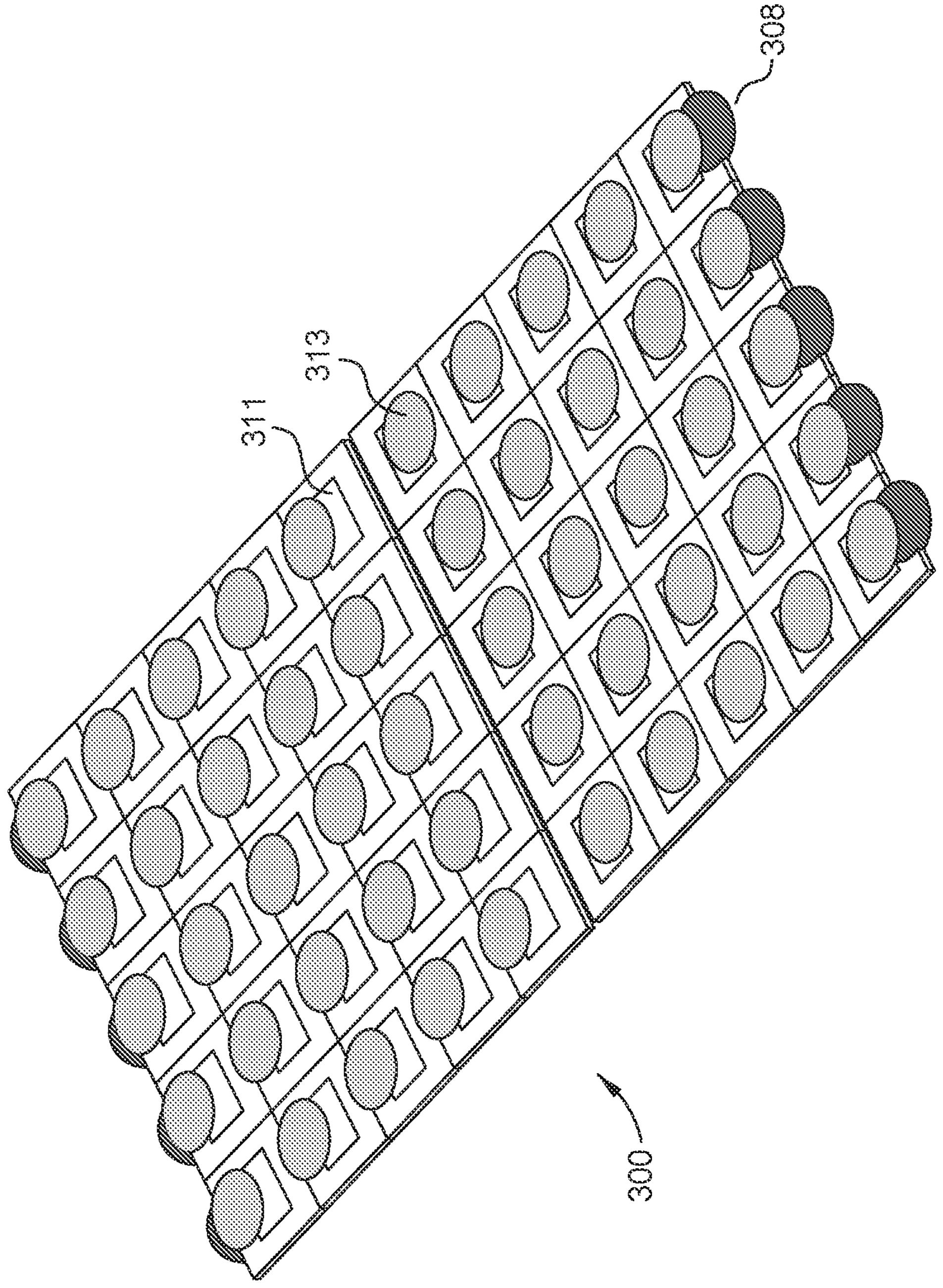
Figure 3B:
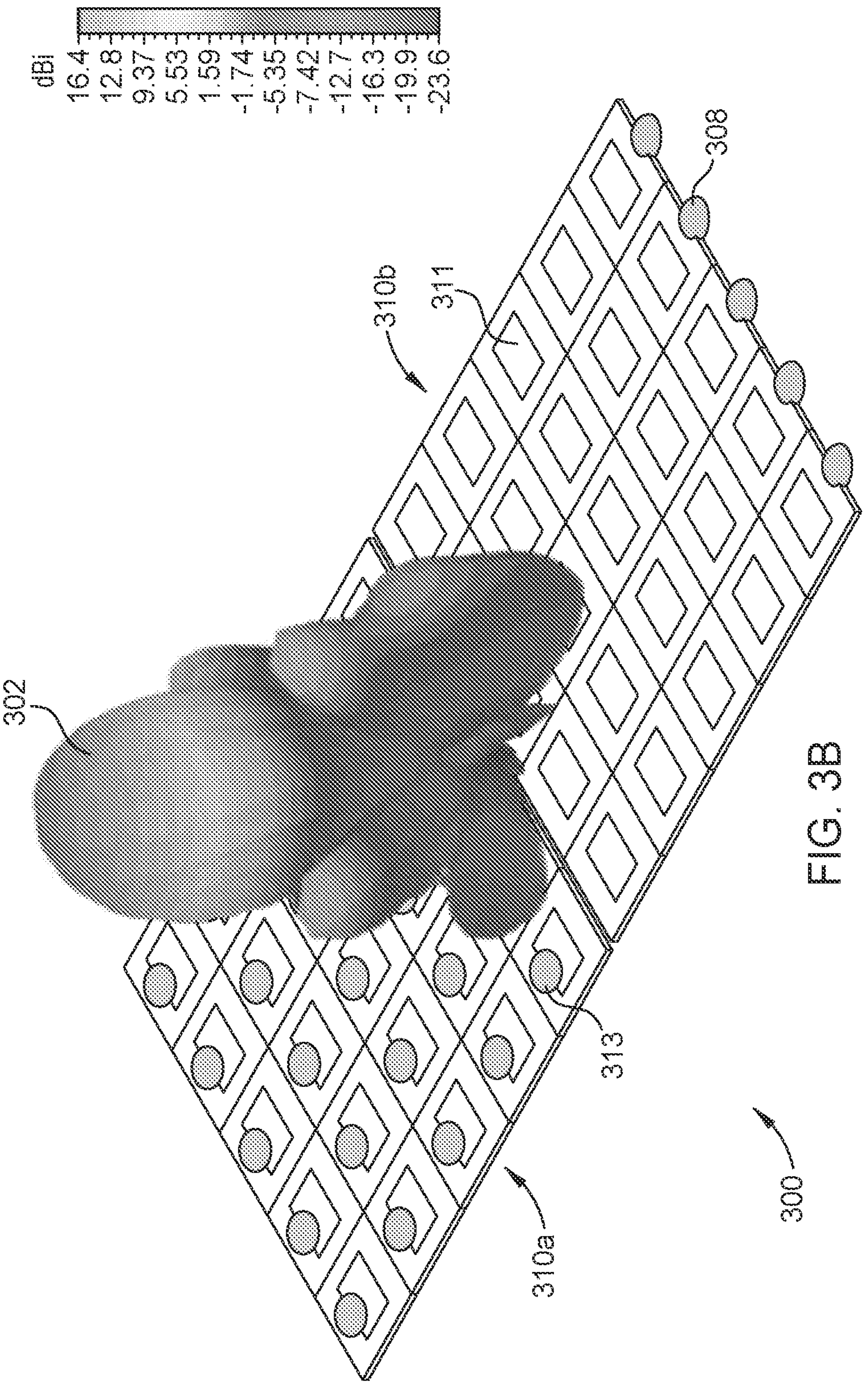
FIGS. 3B-E show simulated radiation pattern examples of the array of FIG. 3A.
Figure 3C:
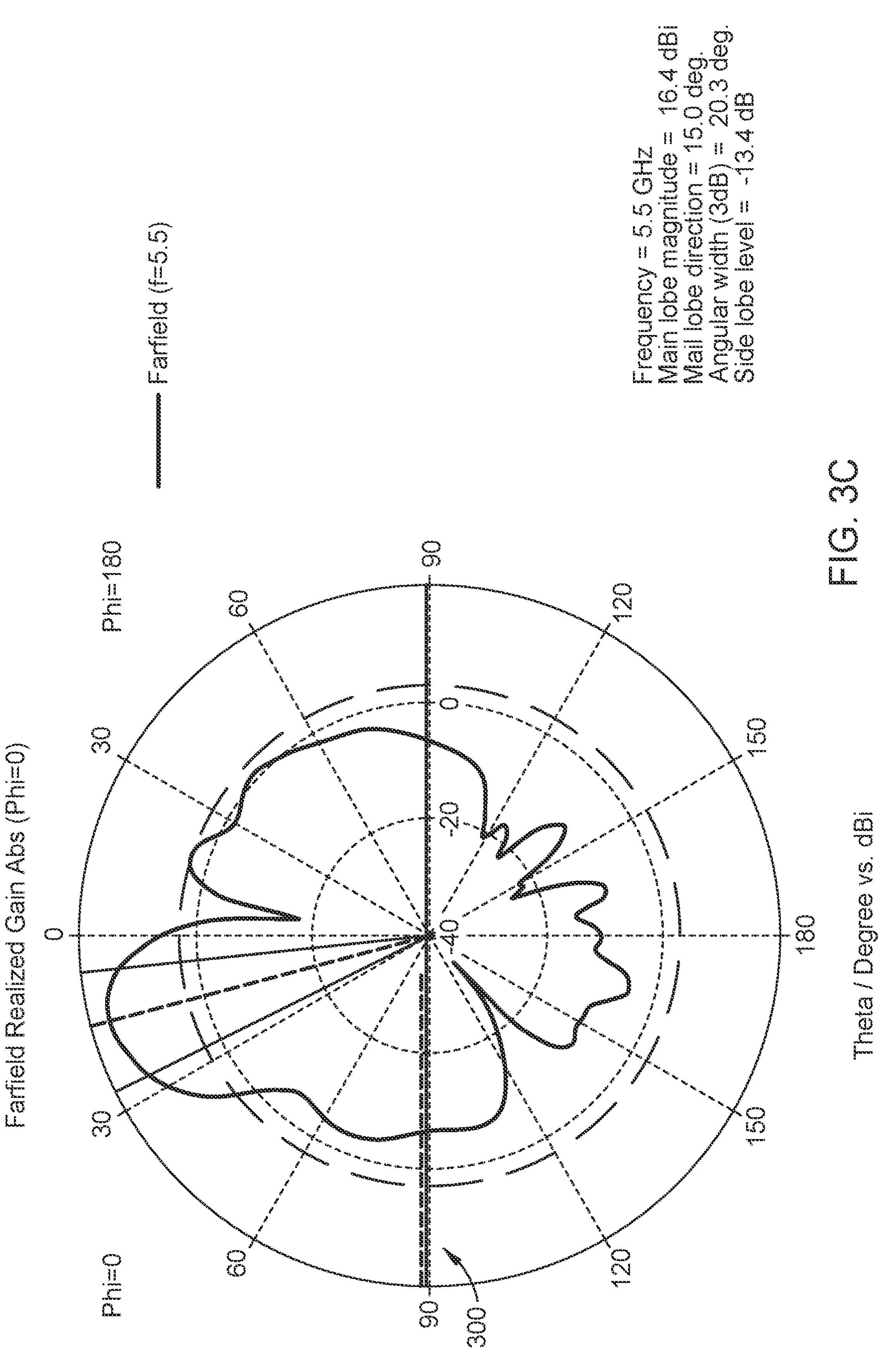

FIG. 3A shows modeled array 300, which includes RF ground 308, antenna element 311, and variable capacitor 313 (e.g., a varicap diode). FIGS. 3B and 3C show a simulated radiation pattern of array 300, with a capacitance value of the variable capacitors 313 of the 5×5 sub-array 310*a* set at a resonant impedance value and a capacitance value of the variable capacitors (not shown) of 5×5 sub-array 310*b* set at a non-resonant value. In one aspect, the non-resonant value includes an electrical short-circuit impedance value that electrically shorts antenna elements 311 of sub-array 310*b*.

The produced main lobe 302 is relatively narrow both in terms of azimuth and elevation. As shown in FIG. 3C, the radiation pattern is characterized as a 5.5 Ghz RF signal, with a main lobe magnitude (farfield) of 16.4 dB, a leftward inclination of 15 degrees, an angular width (3 db) of 20.3 degrees, and a side lobe level of −13.4 dBi.

Figure 3D:
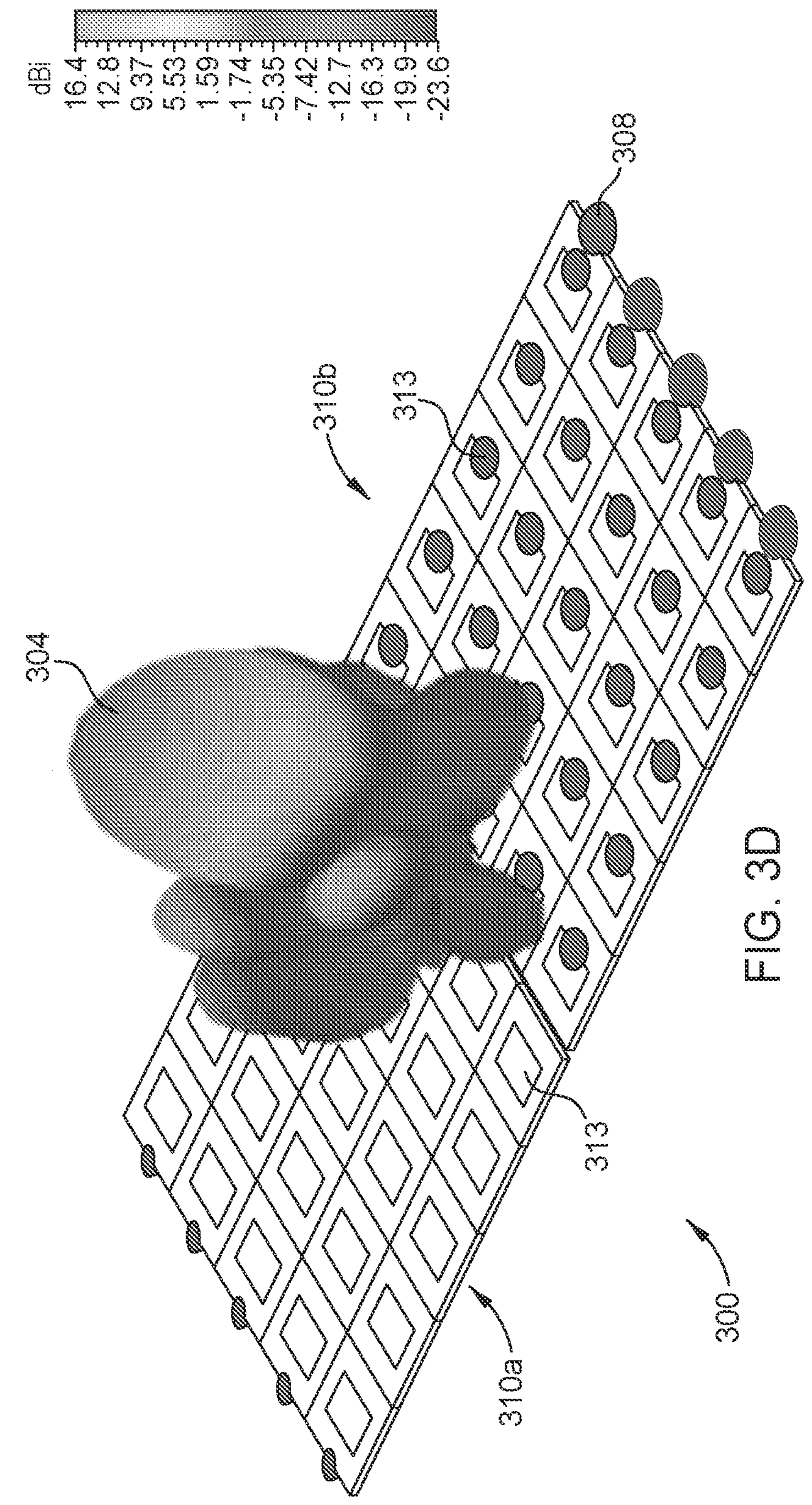
Figure 3E:
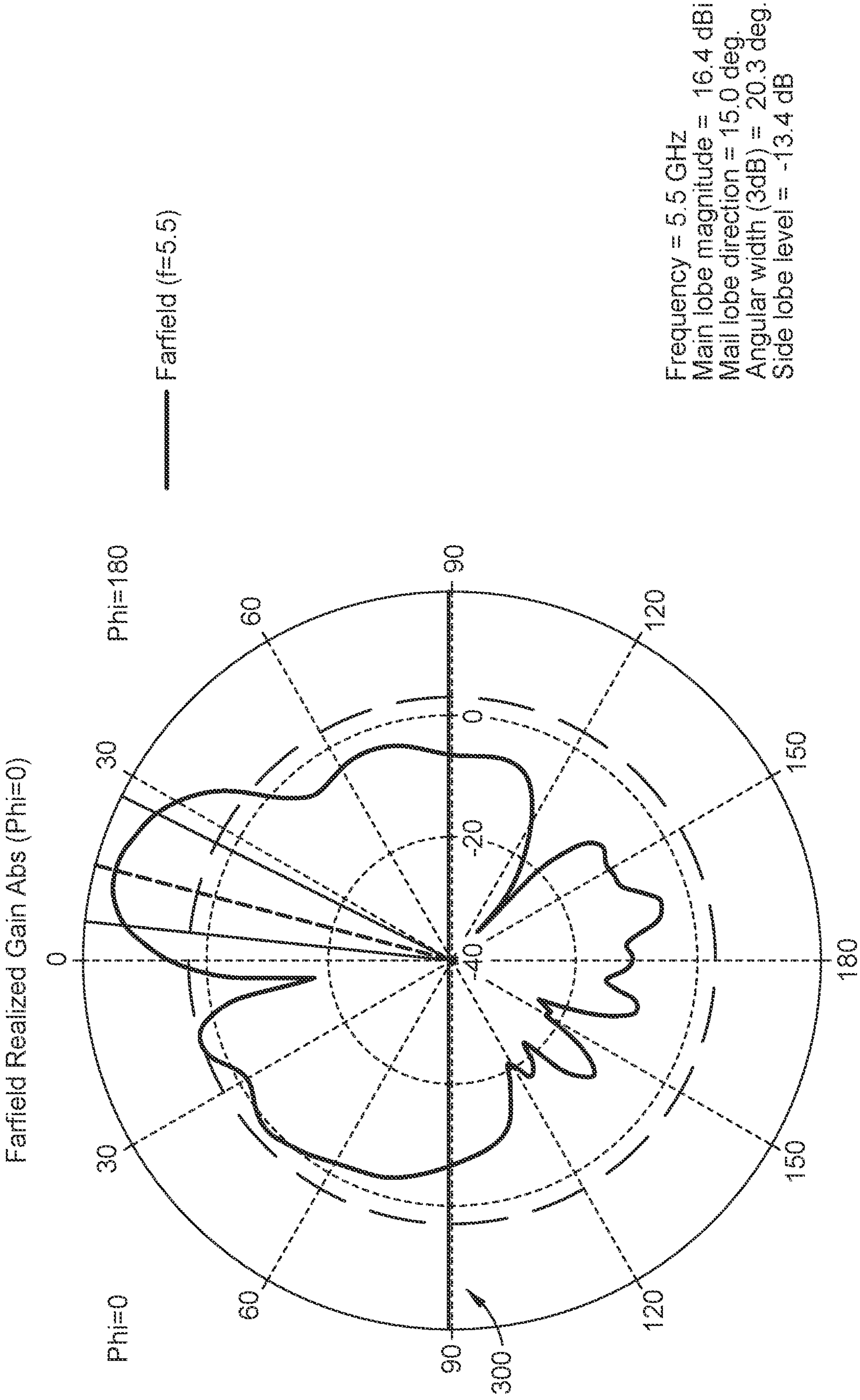

In contrast, FIGS. 3D and 3E show a simulated radiation pattern of array 300, with 5×5 sub-array 310*a* set at a non-resonant impedance value and sub-array 310*b* set at a resonant value. As such, main lobe 304 is a mirror image of main lobe 302 and shares the same radiation pattern and strength characteristics, but with a rightward inclination of 15 degrees.

Figure 4A:
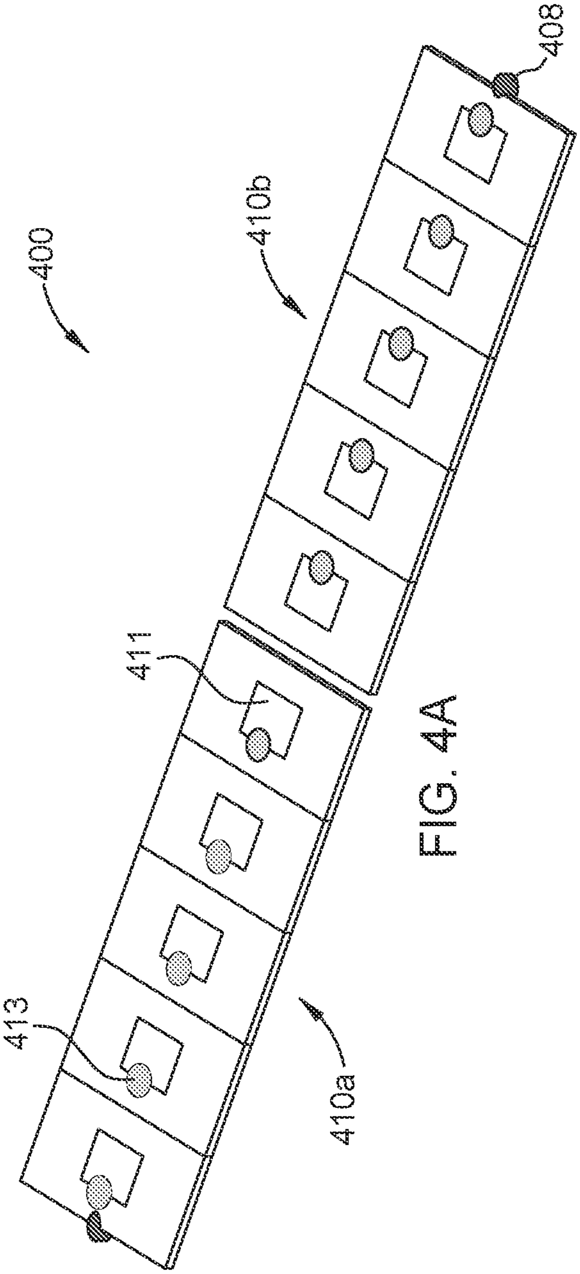
FIGS. 4A and 4B show an example array.
Figure 4B:
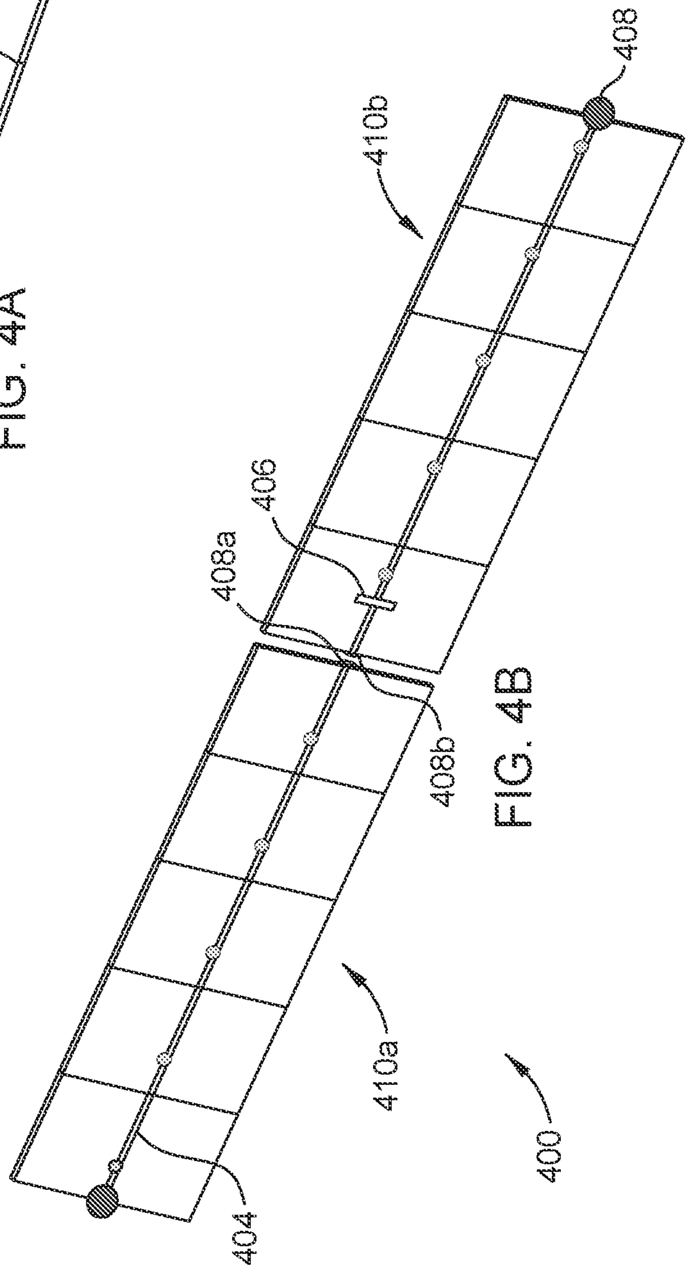
Figure 4C:
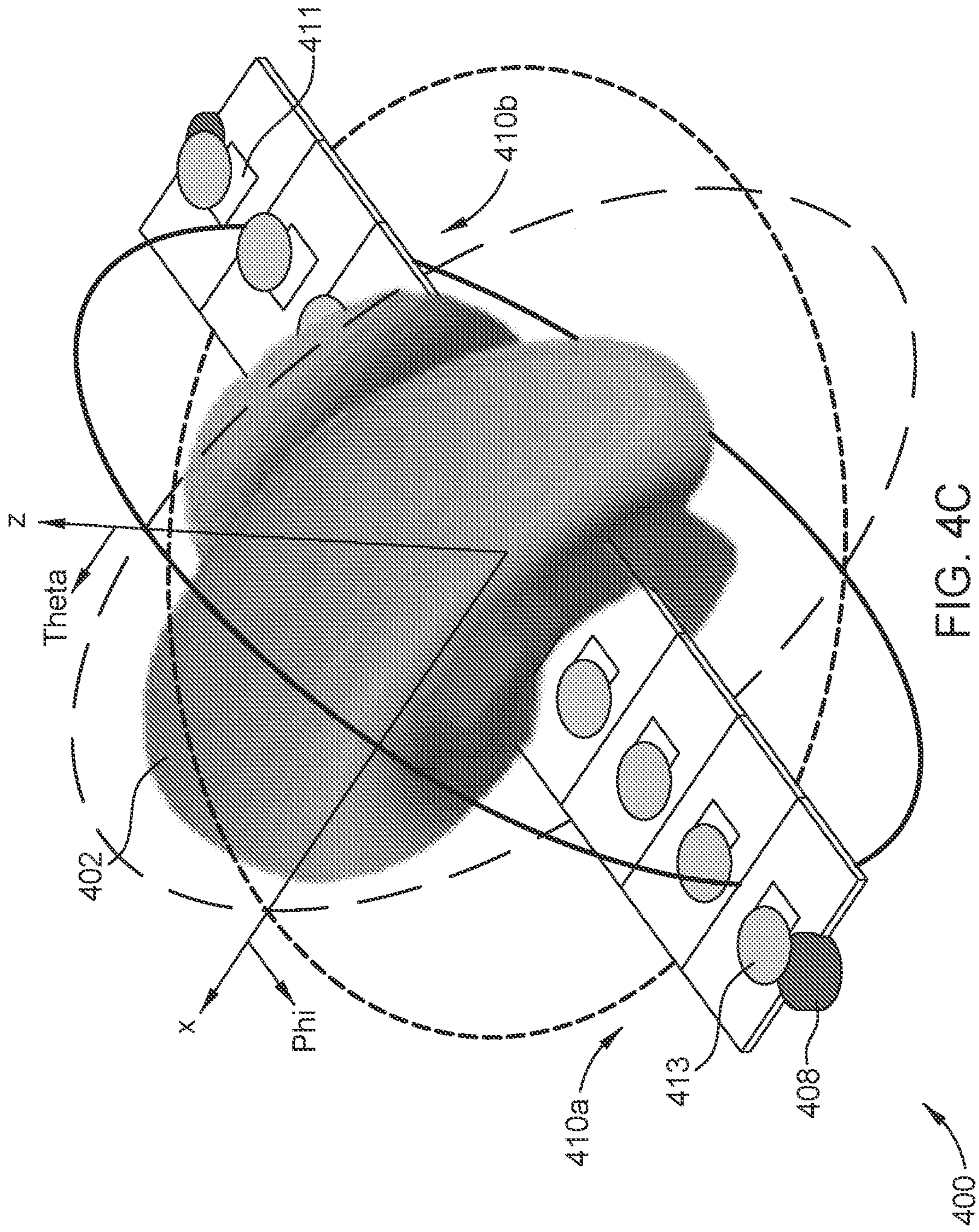
FIGS. 4C-4F show simulated radiation pattern examples of the array of FIGS. 4A and 4B.
Figure 4D:
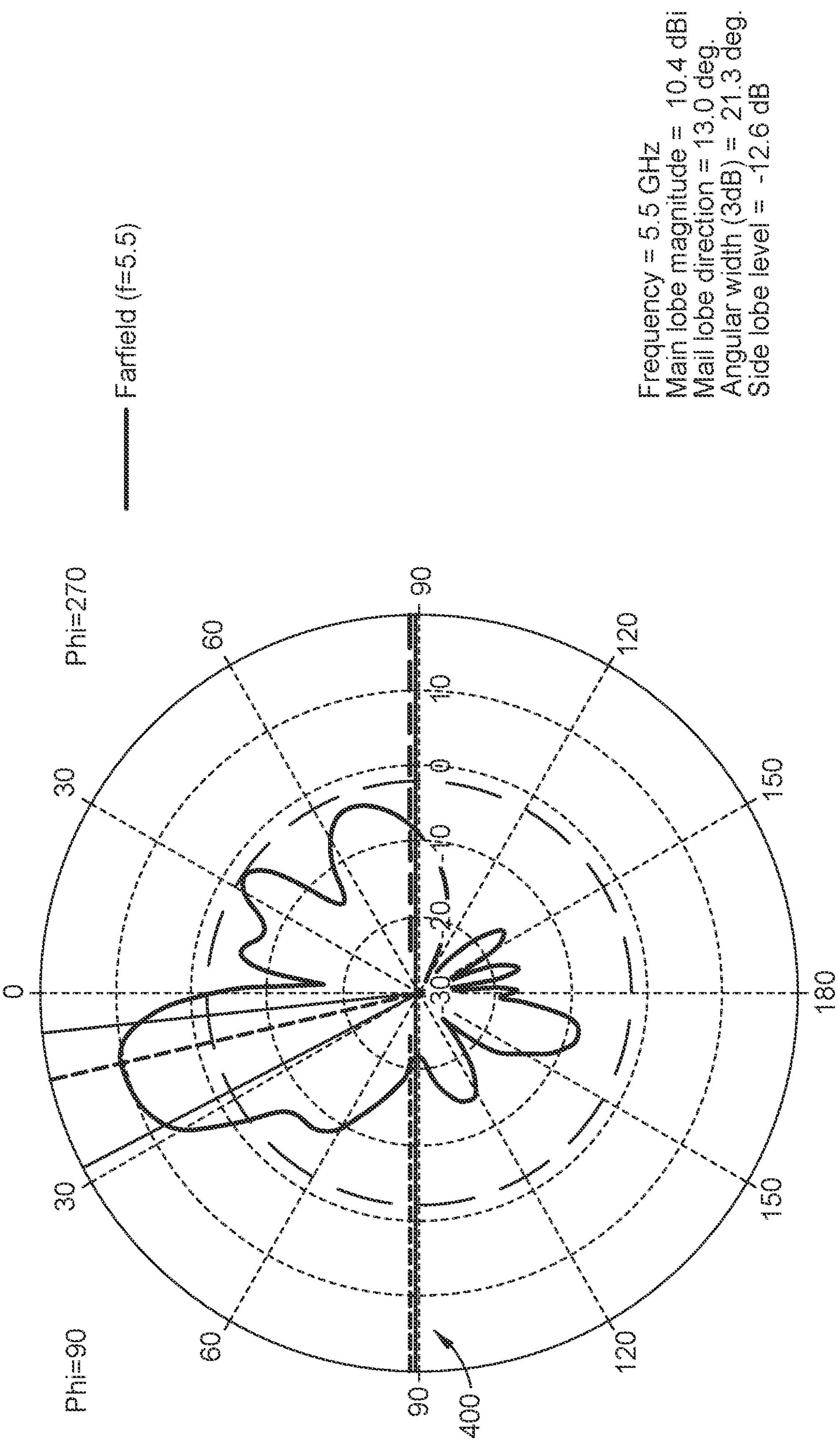

FIGS. 4A and 4B show modeled array 400, which includes aperture 406 (shown only for one antenna element 411), RF ground 408, antenna elements 411, variable capacitors 413, RF feed ports 408*a* and 408*b*, with sub-arrays 410*a* and 410*b*. FIGS. 4C and 4D show a simulated radiation pattern of array 400, with a capacitance value of the variable capacitors 413 of the 1×5 sub-array 410*a* set at a resonant impedance value. The capacitance value of the variable capacitors (not shown) of 1×5 sub-array 410*b* is set at a non-resonant value. In one aspect, the non-resonant value electrically shorts antenna elements 411 of sub-array 410*b*.

The produced main lobe 402 is relatively narrow in terms of azimuth and wide in terms of elevation. As shown in FIG. 4D, the radiation pattern is characterized as a 5.5 Ghz RF signal, with a main lobe magnitude (farfield) of 10.4 dB, a leftward inclination of 13 degrees, an angular width (3 db) of 21.3 degrees, and a side lobe level of −12.6 dB.

Figure 4E:
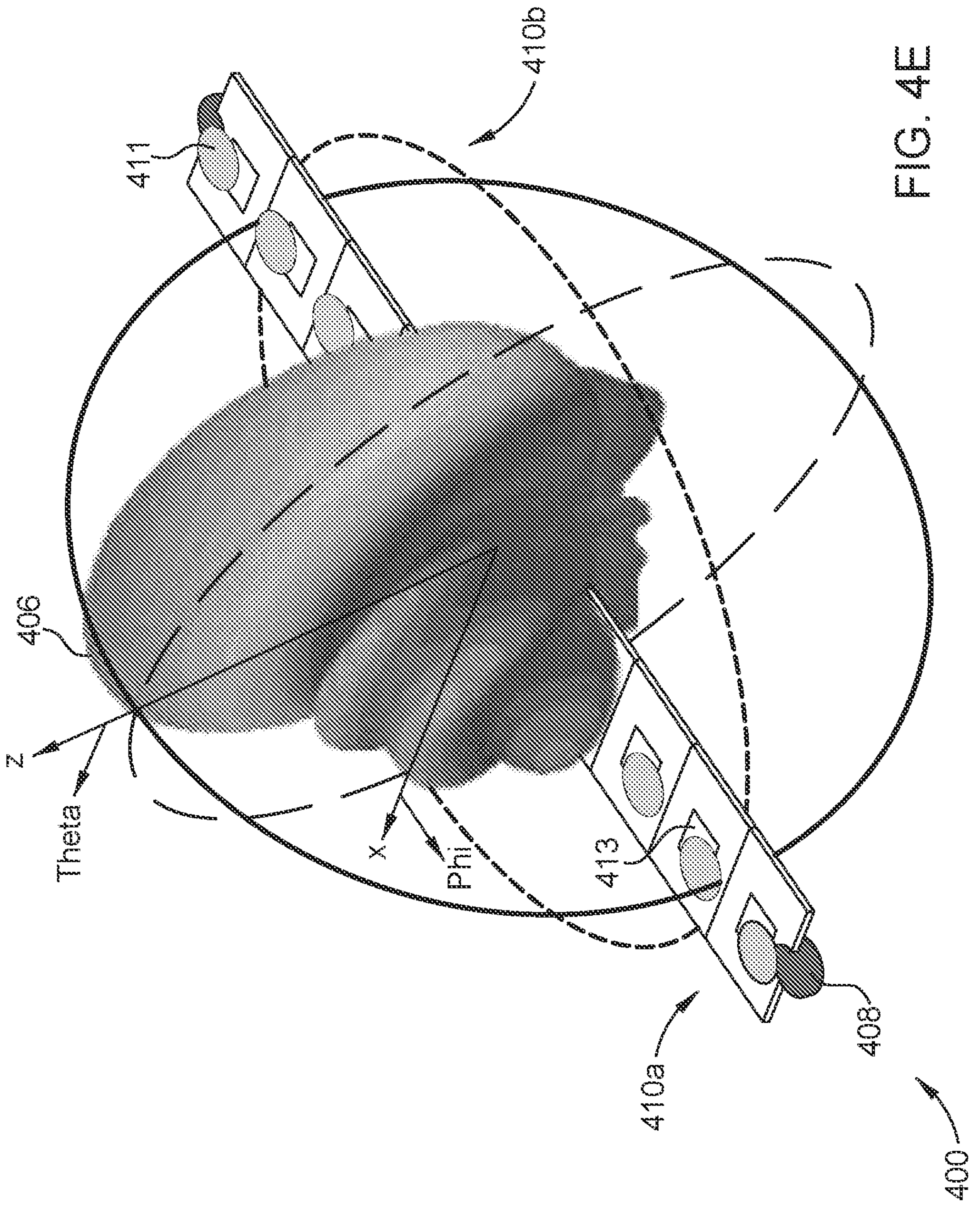
Figure 4F:
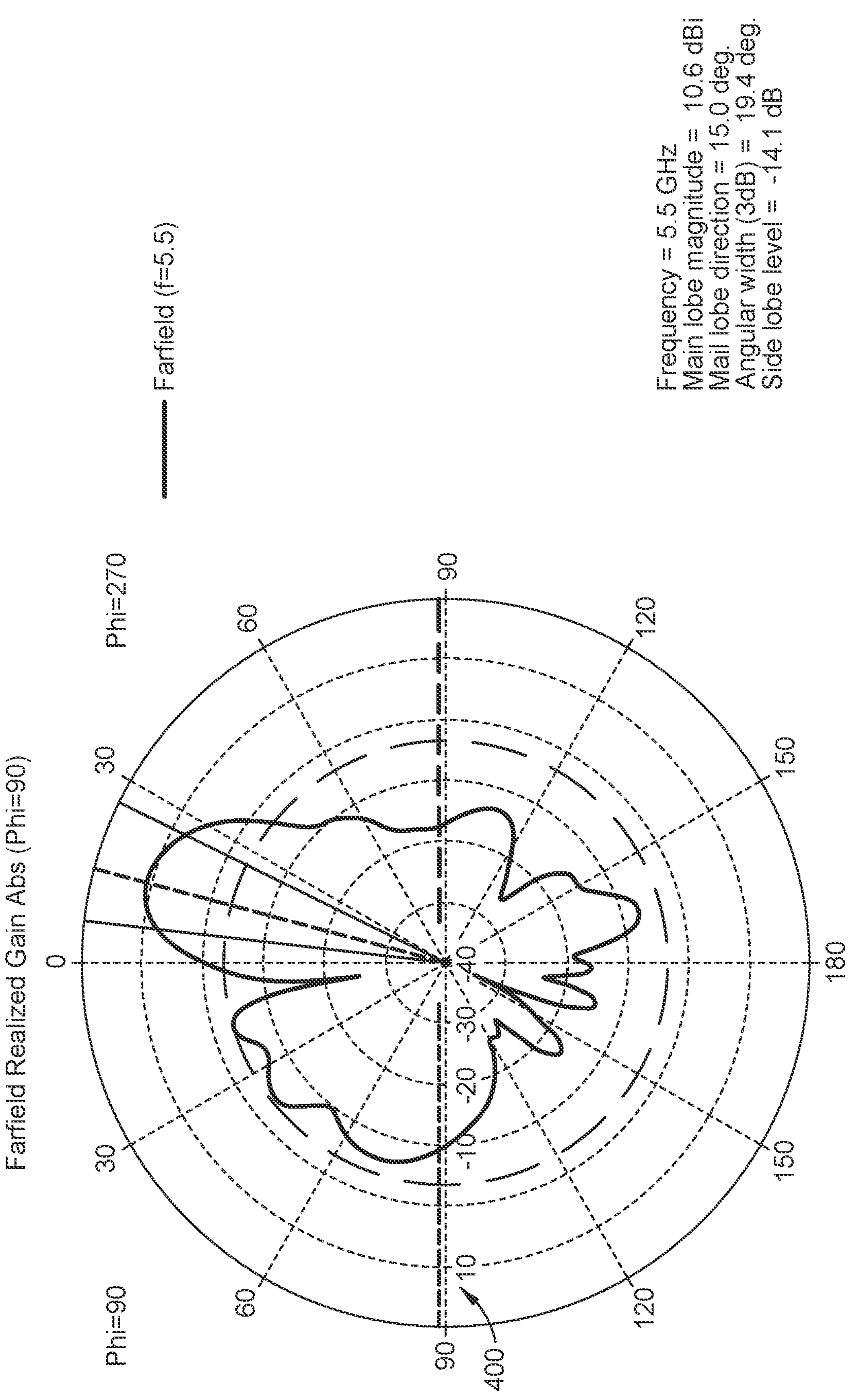

In contrast, FIGS. 4E and 4F show a simulated radiation pattern of array 400, with 1×5 sub-array 410*a* set at a non-resonant impedance value and sub-array 410*b* set at a resonant value. Main lobe 404 shares a similar radiation pattern and strength characteristics, with a main lobe magnitude of 10.6 dBi, a rightward inclination of 15 degrees, an angular width of 19.4 dB, and a side lobe level of −14.1 dB.

Figure 5:
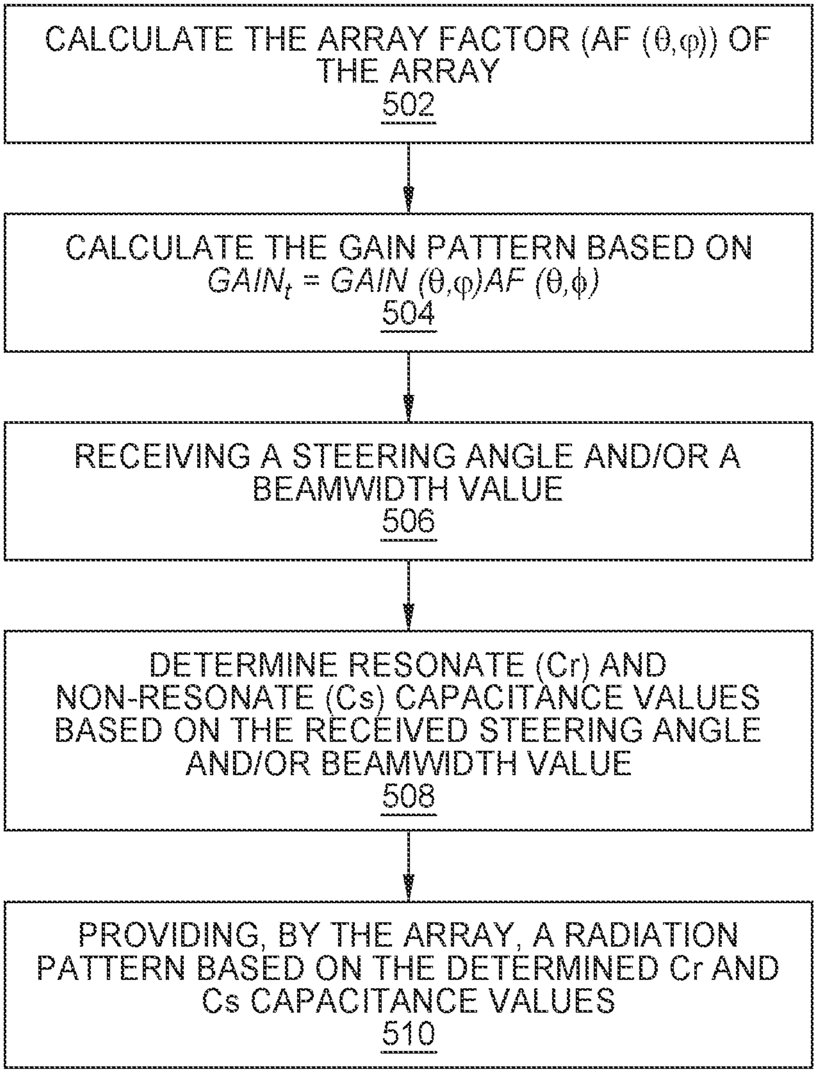
FIG. 5 shows an example method for establishing beam steering control.

FIG. 5 shows method 500 for establishing beam steering control. In one aspect, embodiment arrays can be electronically steered with high granularity and steering angles without utilizing a butler matrix. In one aspect, a steering angle preset(s) can be provided (e.g., stored in memory 120) before, during, and/or after installation of a wireless access point system. In one aspect, each steering angle preset may be associated with a group of patch elements that are resonated, depending on a beam being shifting to boresight, left, or right with respect to an array. For example, a main lobe can be steered in a 3D space in both azimuth and elevation angles based on pre-determined impedance values for particular antenna elements.

In one aspect, a main lobe is electronically steered with fine granularity by modifying an input impedance (Zin) seen by an RF communication signal. In one aspect, an input impedance is modified by varying capacitance through DC biasing of a varactor diode or PIN diode such as applying a reverse voltage to a varactor and/or PIN diodes that are electrically coupled to a respective antenna element. In one aspect, a resonant capacitance value (Cr) is selected for resonating an antenna element at a first frequency and a non-resonant capacitance value (Cs) (e.g., an electrical short-circuit impedance value) is selected for electrically shoring an antenna element short at the first frequency.

For example, block 502 includes calculating an array factor of the array. In one aspect, block 502 may be implemented based on the following formula:

$$AF = \sum_{n=1}^{N}\sum_{m=1}^{M} a_{nm} e^{j(n-1)(kd_x sin\theta cos\varphi+\beta_x)} e^{j(m-1)(kd_y sin\theta sin\varphi+\beta_y)}$$

N represents an array column or "x" and M represents an array row or "y". The distances between antenna elements along x and y are respectively represented by $d_x$ and $d_y$. $B_x$ and $B_y$ represent the phase shift(s) between antenna elements, which may be known by a feed network. θ, φ respectively represent the spherical coordinate system angles in the Z-Y plane and X-Y plane. k is a propagation constant and $a_{nm}$ represents the excitation or resonance of each antenna element. In one aspect, $a_{nm}$ may be controlled by varying a capacitance value or other variable impedance value of an impedance tuning element.

Block 504 includes calculating the gain pattern (e.g., a radiation pattern) based on the calculated array factor of block 502. Block 506 includes receiving at least one of a steering angle and a beamwidth value. The steering angle and beamwidth may be provided from a user selection and/or by, for example, beamforming module 114 or beamsteering module 116 in FIG. 1. Block 508 includes determining a resonant (Cr) and non-resonant (Cs) capacitive values based on at least one of the received steering angle and beamwidth value. Block 510 includes providing, by the array, a radiation pattern based on the determined Cr and Cs capacitance values.

For example and as stated earlier, a resonant capacitance value (Cr) may be selected for resonating an antenna element at a first frequency and a non-resonant capacitance value (Cs) may be selected for electrically shoring an antenna element short at the first frequency. In one aspect, multiple values could satisfy Cr and Cs, so the determined and/or selected Cr and Cs values may provide a larger delta (in picofarads) between them to minimize neighboring short elements acting as parasitic radiators due to energy coupling between or among resonating elements, thereby minimizing side lobes levels, which may range from −10 to −15 dBr in embodiment aspects. In one aspect, determining Cr and Cs may include a diode reactance value (e.g., Series Inductance (Is)/capacitance value) due to packaging leads such as the SOD-882 package with ls being about 0.45 nH.

In one aspect, the capacitance values may be provided as follows for each element of a 5×10 array, Cij, where i represent an array row value and j represents an array column value. At constant gain being 10 dBi, the capacitance at each element Cij may be:

$$\text{Beam Steering } (+X \text{ degrees}): Ci1 \text{ through } Ci5 = Cr \text{ and } Ci6 \text{ through } Ci10 = Cs$$

$$\text{Beam Steering } (-X \text{ degrees}): Ci1 \text{ through } Ci5 = Cs \text{ and } Ci6 \text{ through } Ci10 = Cr$$

To Increase a gain (e.g., 3 dB) and/or angular width (e.g., 3 dB beam width) of an array, the capacitance at each element Cij may be:

$$\text{Beam Steering } (+X \text{ degrees}): Ci1 \text{ through } Ci7 = Cr \text{ and } Ci8 \text{ through } Ci10 = Cs$$

$$\text{Beam Steering } (-X \text{ degrees}): Ci1 \text{ through } Ci3 = Cs \text{ and } Ci7 \text{ through } Ci10 = Cr$$

Figure 6:
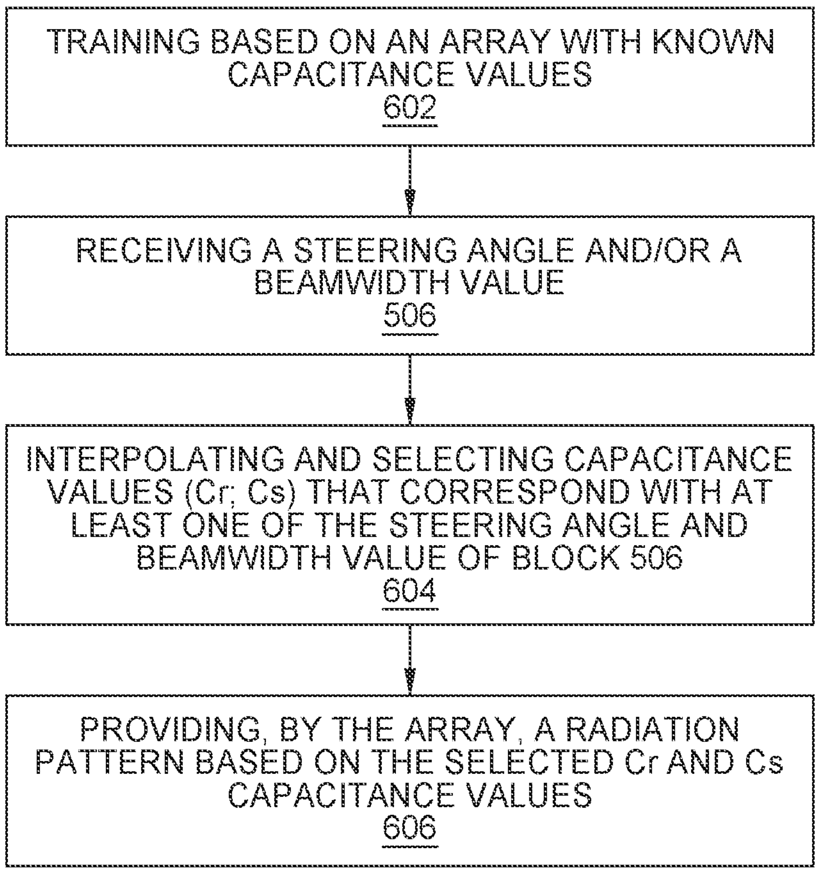
FIG. 6 shows another example method for establishing beam steering control.

FIG. 6 shows another method 600 for establishing beam steering control. Block 602 includes training (e.g., using a model and/or algorithm) based on an array with known capacitance values (e.g., Cr and Cs values). Block 506 includes receiving a steering angle and/or beamwidth value as explained with reference to method 500 of FIG. 5. Block 604 includes interpolating and selecting capacitance values, from said interpolated values, that would provide a radiation pattern that matches or closely matches at least one of the steering angle and beamwidth value provided from block 506. Block 606 includes providing, by the array, a radiation pattern based on the selected Cr and Cs capacitance values.

Figure 7:
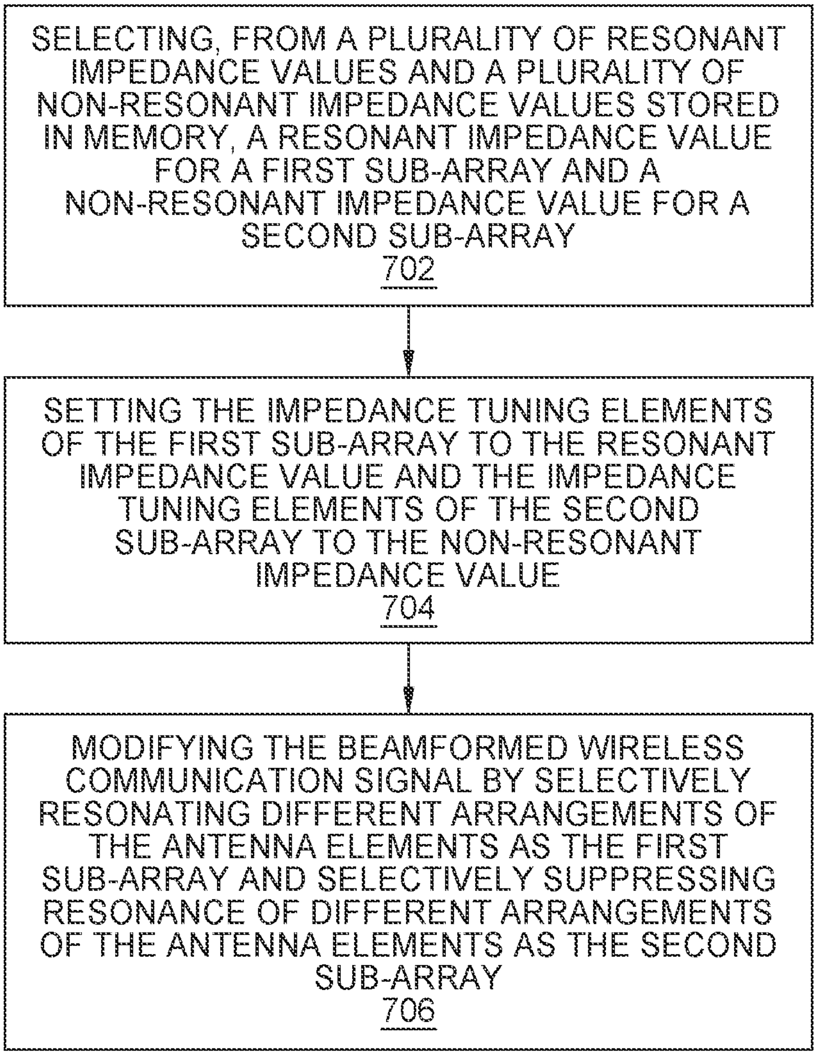
FIG. 7 shows an example method of operating an array.

FIG. 7 shows method 700 for operating an antenna array. Block 702 includes selecting, from a plurality of resonant impedance values and a plurality of non-resonant impedance values stored in memory, a resonant impedance value for impedance tuning elements that are each electrically coupled to a respective antenna element of a first sub-array and a non-resonant impedance value for impedance tuning elements that are each electrically coupled to a respective antenna element of a second sub-array. Block 702 may be performed by, for example, a user, wireless communication module 102 of FIG. 1, and/or modules thereof such as beamforming module 114 and beamsteering module 116 of FIG. 1. The memory of block 702 may be memory 120 of FIG. 1.

Block 704 includes setting the impedance tuning elements of the first sub-array to the resonant impedance value and the impedance tuning elements of the second sub-array to the non-resonant impedance value, thereby configuring the array to provide a beamformed wireless communication signal. Block 704 may be performed by, for example, wireless communication module 102 of FIG. 1. In one aspect, block 704 may be performed by a (sub)module of a wireless communication module such as beamforming module 114 and/or beamsteering module 116 of FIG. 1.

Block 706 includes modifying the beamformed wireless communication signal by selectively resonating different arrangements of antenna elements as the first sub-array (e.g., first sub-array antenna elements) and selectively suppressing resonance of different arrangements of (non-first-sub-array) antenna elements as the second sub-array (e.g. second sub-array antenna elements). In one aspect, modifying may include modifying at least one of a beamwidth and (farfield) signal strength of the beamformed wireless communication signal. Additionally or alternatively, modifying may include beam steering the beamformed wirelesses communication signal.

Block 706 may be performed by, for example, wireless communication module 102 of FIG. 1. In one aspect, block 704 may be performed by a (sub)module of a wireless communication module such as beamforming module 114 and/or beamsteering module 116 of FIG. 1. Block 704 may include selecting, from the plurality of resonant impedance values and the plurality of non-resonant impedance values stored in memory, a second resonant impedance value for impedance tuning elements that are each electrically coupled to the respective antenna element of the first sub-array and a second non-resonant impedance value for impedance tuning elements that are each electrically coupled to the respective antenna element of the second sub-array. In one aspect, the plurality of resonant and non-resonant values stored in memory provide a plurality of radiation patterns, thereby beam switching among pre-set (e.g., pre-determined) beam shapes (e.g., radiation or gain patterns) and/or among beamsteering according to pre-set (e.g., pre-determined) steering angles.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to “the invention” shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A wireless access point system comprising:

an RF feed port;

a transmission line communicatively coupled to the RF feed port and arranged for receiving and providing RF communication signals;

an array comprising antenna elements that are communicatively coupled to the transmission line and arranged for wireless communication; and impedance tuning elements that are each electrically coupled to a respective antenna element of the array, the wireless access point system further comprising at least one of:

a beamforming module adapted to set a resonant impedance value of the impedance tuning elements of a first sub-array, wherein the respective antenna elements of the first sub-array resonate at a first frequency corresponding to a radio frequency (RF) signal conveyed via the RF feed port and the transmission line, the beamforming module further adapted to set a non-resonant impedance value of the impedance tuning elements of a second sub-array for suppressing antenna element resonance at the first frequency corresponding to the RF signal, thereby configuring the array to provide a beamformed wireless communication signal; or a beamsteering module adapted to set the resonant impedance value for the impedance tuning elements of the first sub-array and set the non-resonant impedance value for the impedance tuning elements of the second sub-array for steering the beamformed wireless communication signal.

2. The wireless access point system of claim 1, wherein the impedance tuning elements comprise variable capacitors that are each electrically coupled to an RF ground and the respective antenna element.

3. The wireless access point system of claim 2, wherein the impedance tuning elements comprise reverse-biased diodes that are each electrically coupled to the RF ground and the respective antenna element and at least one of the beamforming module and the beamsteering module adapted to modify a reverse DC bias of each of the reverse-biased diodes.

4. The wireless access point system of claim 3, wherein the reverse-biased diodes include at least one of a varactor diode and a PIN diode.

5. The wireless access point system of claim 1, wherein the antenna elements each define a respective aperture and the antenna elements are arranged to be communicatively coupled to the transmission line via aperture coupling.

6. The wireless access point system of claim 1, wherein the antenna elements comprise patch elements.

7. The wireless access point system of claim 1, wherein the array comprises a first plurality of antenna elements that are communicatively coupled to a first RF port and a second plurality of antenna elements that are communicatively coupled to a second RF port.

8. The wireless access point system of claim 1, wherein at least one of the beamforming module and the beamsteering module is adapted to set, as the non-resonant impedance value, an electrical short-circuit impedance value of the impedance tuning elements of the second sub-array, the impedance tuning elements of the second sub-array configured to electrically short at the first frequency, thereby suppressing parasitic coupling between the antenna elements of the first and the second sub-arrays.

9. The wireless access point system of claim 1, wherein the antenna elements of the first and the second sub-arrays are arranged as at least a row of the array.

10. The wireless access point system of claim 1, wherein the antenna elements of the first and the second sub-arrays are respectively arranged as at least first column and at least a second column of the array.

11. The wireless access point system of claim 1, wherein the antenna elements of the first sub-array are arranged as a first set of rows and columns of the array and the antenna elements of the second sub-array are arranged as a second set of rows and columns of the array.

12. The wireless access point system of claim 1, wherein the beamforming module is adapted to modify the beamformed wireless communication signal by selectively resonating different arrangements of the antenna elements as the first sub-array.

13. The wireless access point system of claim 1, wherein the beamsteering module is adapted to steer the beamformed wireless communication signal by selectively resonating different arrangements of the antenna elements of the first sub-array.

14. The wireless access point system of claim 1, further comprising a circuit substrate that is operably coupled to the RF feed port, the transmission line, the array, and the impedance tuning elements.

15. The wireless access point system of claim 1, wherein the beamforming module is adapted to select at least one of the resonant impedance value from a plurality of resonant impedance values and the non-resonant impedance value from a plurality of non-resonant impedance values, thereby selecting a radiation pattern of the beamformed wireless communication signal.

16. The wireless access point system of claim 15, further comprising a memory that includes the plurality of resonant impedance values and the plurality of non-resonant impedance values.

17. The wireless access point system of claim 1, wherein the beamsteering module is adapted to select at least one of the resonant impedance value from a plurality of resonant impedance values and the non-resonant impedance value from a plurality of non-resonant impedance values, thereby selecting a steering angle from a plurality of steering angles for the beamformed wireless communication signal.

18. The wireless access point system of claim 17, further comprising a memory that includes the plurality of resonant impedance values and the plurality of non-resonant impedance values.

19. The wireless access point system of claim 1, wherein the beamforming module is adapted to configure the array to provide a plurality of beamformed wireless communication signals.

20. The wireless access point system of claim 1, wherein the beamforming module is adapted to configure the array to provide a null that is arranged between or among beamformed wireless communication signals.

21. The wireless access point system of claim 20, further comprising a wireless client detection module that is adapted to detect a wireless client via the null.

22. The wireless access point system of claim 1, further comprising a wireless communication module communicatively coupled to the RF feed port and adapted to provide wireless communication channels of the beamformed wireless communication signal.

23. The wireless access point system of claim 22, wherein the wireless communication module comprises an RF frontend communicatively coupled to the RF feed port and a baseband processor communicatively coupled to the RF frontend.

24. The wireless access point system of claim 22, wherein the wireless communication module is adapted to provide the wireless communication channels according to an IEEE 802.11 technical standard.

25. The wireless access point system of claim 24, wherein at least one of the wireless communication channels include a center frequency between 1 GHz and 10 GHz.

26. A method comprising:

selecting, from a plurality of resonant impedance values and a plurality of non-resonant impedance values stored in memory, a resonant impedance value for impedance tuning elements that are each electrically coupled to a respective antenna element of a first sub-array of an antenna array and a non-resonant impedance value for impedance tuning elements that are each electrically coupled to a respective antenna element of a second sub-array of the antenna array;

setting, by a wireless communication module, the impedance tuning elements of the first sub-array to the resonant impedance value for resonating respective antenna elements of the first sub-array at a first frequency corresponding to a radio frequency (RF) signal and the impedance tuning elements of the second sub-array to the non-resonant impedance value for suppressing antenna element resonance at the first frequency corresponding to the RF signal, thereby configuring the antenna array to provide a beamformed wireless communication signal; and modifying, by the wireless communication module, the beamformed wireless communication signal by selectively resonating different arrangements of first subarray antenna elements and selectively suppressing resonance of different arrangements of second sub-array antenna elements.

27. The method of claim 26, wherein the modifying step comprises modifying, by the wireless communication module, the beamformed wireless communication signal by selecting, from the plurality of resonant impedance values and the plurality of non-resonant impedance values stored in memory, a second resonant impedance value for impedance tuning elements that are each electrically coupled to the respective antenna element of the first sub-array and a second non-resonant impedance value for impedance tuning elements that are each electrically coupled to the respective antenna element of a second sub-array, thereby selectively resonating different arrangements of first sub-array antenna elements and selectively suppressing resonance of different arrangements of second sub-array antenna elements.

28. A wireless communication module adapted to at least one of:

set a resonant impedance value of impedance tuning elements of a first sub-array of an antenna element array for resonating respective antenna elements of the first sub-array at a first frequency corresponding to a radio frequency (RF) signal, and set a non-resonant impedance value of impedance tuning elements of a second sub-array of the antenna element array for suppressing antenna element resonance at the first frequency corresponding to the RF signal, thereby providing a beamformed wireless communication signal; or set the resonant impedance value for the impedance tuning elements of the first sub-array and set the non-resonant impedance value for the impedance tuning elements of the second sub-array for steering the beamformed wireless communication signal.

* * * * *